(12) United States Patent
Shiwaya

(10) Patent No.: US 8,295,064 B2
(45) Date of Patent: Oct. 23, 2012

(54) OPERATION CONTROL METHOD OF CHARGE PUMP CIRCUIT

(75) Inventor: Yohichi Shiwaya, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 376 days.

(21) Appl. No.: 12/665,583

(22) PCT Filed: Oct. 8, 2008

(86) PCT No.: PCT/JP2008/068695
§ 371 (c)(1),
(2), (4) Date: Dec. 18, 2009

(87) PCT Pub. No.: WO2009/060699
PCT Pub. Date: May 14, 2009

(65) Prior Publication Data
US 2010/0188065 A1    Jul. 29, 2010

(30) Foreign Application Priority Data
Nov. 5, 2007    (JP) ................... 2007-287039

(51) Int. Cl.
H02M 3/18    (2006.01)
(52) U.S. Cl. .......................... 363/60; 327/536
(58) Field of Classification Search ............ 363/59, 363/60; 327/536
See application file for complete search history.

(56) References Cited

U.S. PATENT DOCUMENTS

| | | | |
|---|---|---|---|
| 5,581,454 A * | 12/1996 | Collins | 363/59 |
| 6,198,645 B1 * | 3/2001 | Kotowski et al. | 363/59 |
| 6,284,705 B1 * | 9/2001 | Park et al. | 502/417 |
| 6,304,007 B1 * | 10/2001 | Yu | 307/110 |
| 6,563,235 B1 * | 5/2003 | McIntyre et al. | 307/109 |
| 6,985,024 B2 * | 1/2006 | Geen | 327/536 |
| 7,279,957 B2 * | 10/2007 | Yen | 327/536 |
| 7,518,892 B2 * | 4/2009 | Kitagawa et al. | 363/59 |
| 8,089,788 B2 * | 1/2012 | Jain | 363/65 |
| 2002/0109415 A1 | 8/2002 | McIntyre et al. | |

(Continued)

FOREIGN PATENT DOCUMENTS

CN    1997250 A    7/2007

(Continued)

OTHER PUBLICATIONS

Aug. 26, 2011 Korean official action in connection with a counterpart Korean patent application (with English translation).

(Continued)

Primary Examiner — Shawn Riley
(74) Attorney, Agent, or Firm — Cooper & Dunham LLP

(57) ABSTRACT

A disclosed operation control method of a charge pump circuit for boosting an input voltage to a desired magnitude in the range between the input voltage and twice the input voltage and outputting the boosted voltage. The method includes the steps of (a) during a charging period, charging, with the input voltage, one or more of the capacitors connected in series by selectively turning on one or more of the first switches in accordance with the desired voltage magnitude, turning on the third switch, and selectively turning on the second switch or one of the fourth switches; and (b) during a discharging period, turning off the third switch and the second switch or the fourth switch having been turned on; selectively turning on one or more of the first switches; and turning on one or more fourth and the fifth switches.

5 Claims, 11 Drawing Sheets

U.S. PATENT DOCUMENTS

| | | |
|---|---|---|
| 2004/0004851 A1 | 1/2004 | Itoh |
| 2005/0169021 A1 | 8/2005 | Itoh |
| 2006/0176718 A1 | 8/2006 | Itoh |
| 2007/0297203 A1 | 12/2007 | Itoh |

FOREIGN PATENT DOCUMENTS

| | | |
|---|---|---|
| JP | 6-165481 | 6/1994 |
| JP | 2000-60111 | 2/2000 |
| JP | 2003-284324 | 10/2003 |
| JP | 2005-278295 | 10/2005 |
| JP | 2006-20412 | 1/2006 |
| JP | 3911188 | 2/2007 |

OTHER PUBLICATIONS

Mar. 14, 2012 Chinese official action (with English translation) in connection with a counterpart Chinese patent application.

* cited by examiner

OPERATION CONTROL METHOD OF CHARGE PUMP CIRCUIT

TECHNICAL FIELD

The present invention relates to an operation control method of an output-voltage-variable charge pump circuit, and in particular to an operation control method of a charge pump circuit capable of outputting a voltage having a magnitude in the range between an input voltage and twice the input voltage.

BACKGROUND ART

FIG. 11 is a circuit diagram showing an example of a conventional charge pump circuit (see Patent Document 1, for example).

The charge pump circuit of FIG. 11 is able to output a voltage having a magnitude raised to $(1+1/n)$ times an input voltage $V_{in}$ as an output voltage $V_{out}$ by providing an adequate number of flying capacitors C1-Cn (n is an integer larger than 1). If n=3, for example, the charge pump circuit outputs, as the output voltage $V_{out}$, a voltage having a magnitude raised by three flying capacitors C1-C3 to $(1+\frac{1}{3})$ times the input voltage $V_{in}$. That is to say, depending on the number of flying capacitors, a voltage having a magnitude in the range between the input voltage $V_{in}$ and twice the input voltage $V_{in}$, can be provided as the output voltage $V_{out}$.

Patent Document 1: Japanese Patent Publication No. 3911188

However, the conventional charge pump circuit leaves the problem that only one voltage magnitude equal to $(1+1/n)$ times the input voltage $V_{in}$ can be obtained for the output voltage $V_{out}$ in the case of providing n flying capacitors.

DISCLOSURE OF THE INVENTION

In view of the conventional problem, the present invention aims at offering an operation control method of a charge pump circuit for generating the output voltage $V_{out}$, the magnitude of which is variable in the range between the input voltage $V_{in}$ and twice the input voltage $V_{in}$.

According to one aspect of the present invention, there is provided an operation control method of an output-voltage-variable charge pump circuit for boosting an input voltage input to an input terminal of the charge pump circuit to a desired voltage magnitude in the range between the input voltage and twice the input voltage and outputting the boosted voltage from an output terminal of the charge pump circuit as an output voltage. The charge pump circuit includes multiple flying capacitors; one or more first switching elements, each of which is configured to connect two of the flying capacitors in series to form a series circuit including the flying capacitors and the one or more first switching elements; a second switching element configured to connect one end of the series circuit to the input terminal; a third switching element configured to connect another end of the series circuit to ground; multiple fourth switching elements, each of which corresponds to a different one of the flying capacitors and is configured to connect a lower voltage terminal of the corresponding flying capacitor to the input terminal; and multiple fifth switching elements, each of which corresponds to a different one of the flying capacitors and is configured to connect a higher voltage terminal of the corresponding flying capacitor to the output terminal. The operation control method includes the steps of (a) during a charging period for charging one or more of the flying capacitors, charging, with the input voltage, one or more of the flying capacitors connected in series by selectively turning on one or more of the first switching elements in accordance with the desired voltage magnitude, turning on the third switching element, and selectively turning on the second switching element or one of the fourth switching elements; and (b) during a discharging period for discharging charges accumulated in the one or more of the flying capacitors, outputting the output voltage having the desired voltage magnitude from the output terminal by connecting selected one or more of the lower voltage terminals of the one or more charged flying capacitors to the input terminal and connecting selected one or more of the higher voltage terminals of the one or more charged flying capacitors to the output terminal by means of turning off the third switching element and the second switching element or the one of the fourth switching elements which has been turned on during the charging period; controlling an on/off state of one or more of the first switching elements; and turning on one or more of the fourth switching elements and one or more of the fifth switching elements.

BEST MODE FOR CARRYING OUT THE INVENTION

Figure 1:
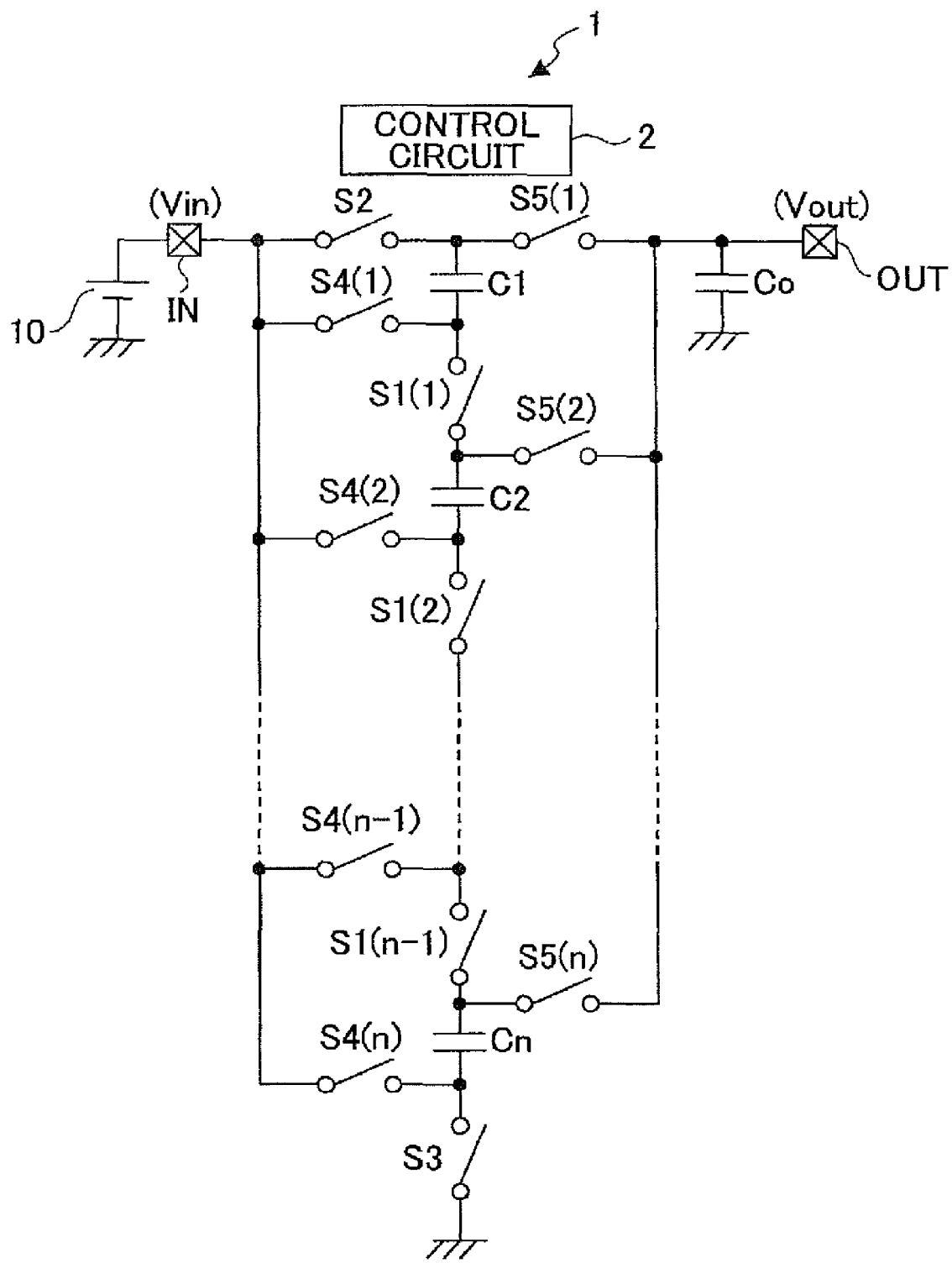
FIG. 1 shows an example of a charge pump circuit according to a first embodiment of the present invention.

The present invention is described next in detail with reference to an embodiment illustrated in the drawings.

First Embodiment

FIG. 1 shows an example of a charge pump circuit according to a first embodiment of the present invention.

A charge pump circuit 1 of FIG. 1 outputs, as an output voltage $V_{out}$ from its output terminal OUT, a voltage having a desired magnitude in the range between an input voltage $V_{in}$ input to its input terminal IN and twice the input voltage $V_{in}$. The input voltage $V_{in}$ is input from a direct-current power source 10, such as a battery or a constant-voltage circuit.

The charge pump circuit 1 includes n flying capacitors C1-Cn (n is an integer larger than 1) each having the same capacitance; an output capacitor Co configured to stabilize the output voltage $V_{out}$; first switching elements S1 (1 through n−1); a second switching element S2; a third switching element S3; fourth switching elements S4 (1 through n); fifth switching elements S5 (1 through n); and a control circuit 2 configured to perform switching control of the first switching elements S1 (1 through n−1), the second switching element S2, the third switching element S3, the fourth switching elements S4 (1 through n) and the fifth switching elements S5 (1 through n).

Note that each of the first switching elements S1 (1 through n−1) is individually a first switching element. The second switching element S2 and the third switching element S3 are a second switching element and a third switching element, respectively. Each of the fourth switching elements S4 (1 through n) is individually a fourth switching element. Each of the fifth switching elements S5 (1 through n) is individually a fifth switching element.

Between the input terminal IN and ground, the second switching element S2, a series circuit and the third switching element S3 are connected in series to one another. In the series circuit, the flying capacitors C1-Cn and the first switching elements S1 (1 through n−1) are alternately arranged and connected to each other. That is to say, in the series circuit formed by the flying capacitors C1-Cn and the first switching elements S1 (1 through n−1), the flying capacitors C1-Cn are connected in series to one another via corresponding first switching elements S1 (1 through n−1). Each of the fourth switching elements S4 (1 through n) is connected between the input terminal IN and a lower voltage terminal of the corresponding one of the flying capacitors C1-Cn. Each of the fifth switching elements S5 (1 through n) is connected between the output terminal OUT and a higher voltage terminal of the corresponding one of the flying capacitors C1-Cn. Note that connections between the control circuit 2 and control electrodes of the first switching elements S1 (1 through n−1), the second switching element S2, the third switching element S3, the fourth switching elements S4 (1 through n) and the fifth switching elements S5 (1 through n) are not shown in FIG. 1.

Operation of the charge pump circuit 1 of FIG. 1 having such a structure is next described specifically by taking the case where three flying capacitors are provided (i.e. n=3), as an example. In this case, the charge pump circuit 1 is able to output, as the output voltage $V_{out}$, a voltage having one of the following five magnitudes: equal to the input voltage $V_{in}$; equal to $(1+\frac{1}{3})$ times the input voltage $V_{in}$; equal to $(1+\frac{1}{2})$ times the input voltage $V_{in}$; equal to $(1+\frac{2}{3})$ times the input voltage $V_{in}$; and equal to twice the input voltage $V_{in}$. According to a selected magnitude of the output voltage $V_{out}$, the control circuit 2 controls on and off of the first switching elements S1 (1 and 2), the second switching element S2, the third switching element S3, the fourth switching elements S4 (1 to 3) and the fifth switching elements S5 (1 to 3).

Figure 2A:
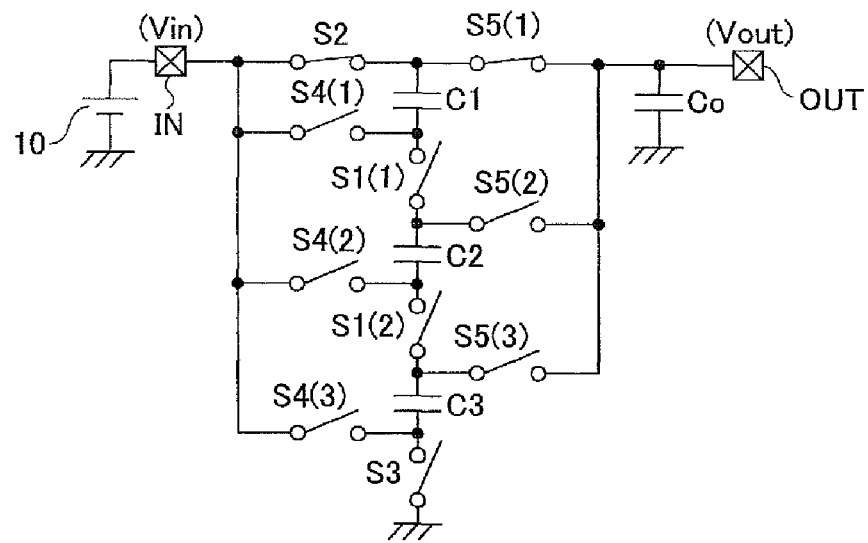
FIGS. 2A through 2C show an ON/OFF mode of each switching element in the case of generating a voltage having a magnitude equal to an input voltage $V_{in}$, and outputting the generated voltage as an output voltage $V_{out}$.
Figure 2B:
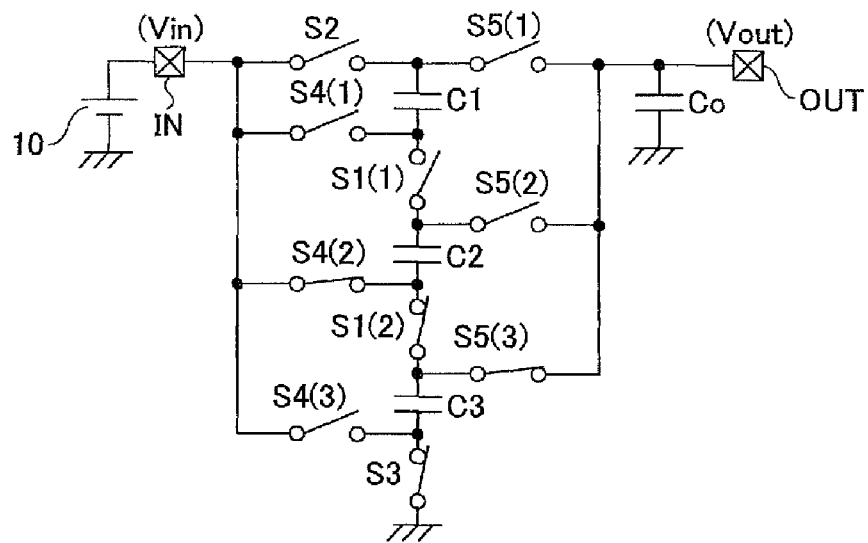
Figure 2C:
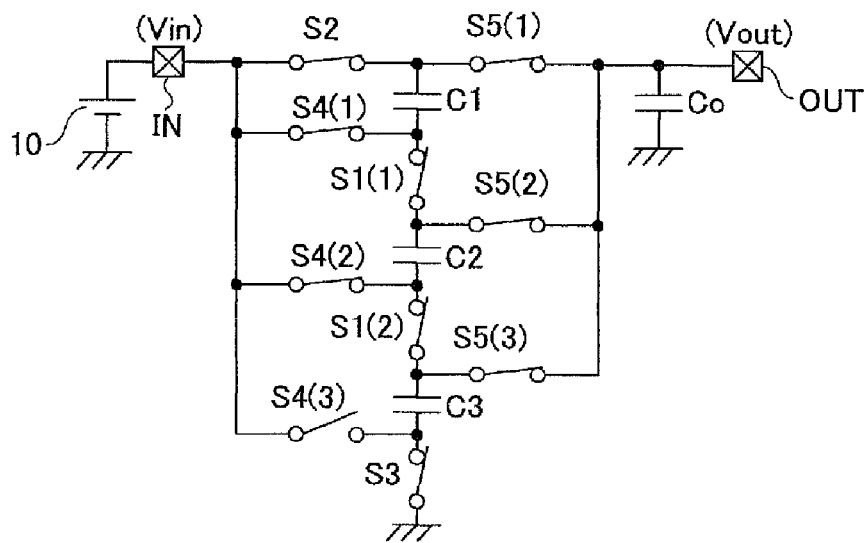

FIGS. 2A through 2C show an ON/OFF mode of each switching element in the case of generating a voltage having a magnitude equal to the input voltage $V_{in}$ and outputting the generated voltage as the output voltage $V_{out}$.

In FIG. 2A, the second switching element S2 and the fifth switching element S5 (1) are turned on and therefore conducting while the remaining switching elements are turned off and therefore blocked. Accordingly, the input terminal IN and the output terminal OUT are connected by the second switching element S2 and the fifth switching element S5 (1), whereby the magnitude of the output voltage $V_{out}$ becomes equal to the magnitude of the input voltage $V_{in}$.

In FIG. 2B, the first switching element S1 (2), the third switching element S3, the fourth switching element S4 (2) and the fifth switching element S5 (3) are turned on and therefore conducting while the remaining switching elements are turned off and therefore blocked. Accordingly, the input terminal IN and the output terminal OUT are connected by the first switching element S1 (2), the fourth switching element S4 (2) and the fifth switching element S5 (3), whereby the magnitude of the output voltage Vout becomes equal to the magnitude of the input voltage $V_{in}$. In addition, the flying capacitor C3 is connected in parallel to the output capacitor Co by the third switching element S3 and the fifth switching element S5 (3). As a result, a capacitance connected to the output terminal OUT increases, in turn resulting in an improvement in the stability of the output voltage $V_{out}$.

In FIG. 2C, the fourth switching element S4 (3) is turned off and therefore blocked while all the remaining switching elements are turned on and therefore conducting. There are three sets of switching elements connected in series to one another between the input terminal IN and the output terminal OUT: the second switching element S2 and the fifth switching element S5 (1); the fourth switching element S4 (1), the first switching element S1 (1) and the fifth switching element S5 (2); and the fourth switching element S4 (2), the first switching element S1 (2) and the fifth switching element S5 (3). The switching elements of all these sets are turned on and therefore conducting. That is to say, in this condition, all switching elements connected in series to one another between the input terminal IN and the output terminal OUT are turned on and therefore conducting. Accordingly, it is possible to minimize the impedance between the input terminal IN and the output terminal OUT.

Furthermore, as in the case of FIG. 2B, the flying capacitor C3 is connected in parallel to the output capacitor Co. Accordingly, the capacitance connected to the output terminal OUT increases, which results in an improvement in the stability of the output voltage $V_{out}$. Note that ON/OFF modes of switching elements to cause a short circuit between the input terminal IN and the output terminal OUT are not limited to the patterns shown in FIGS. 2A through 2C. Any combination of switching elements can be turned on, or furthermore, multiple arbitrary combinations of switching elements may be turned on, provided that those switching elements are connected in series to one another between the input terminal IN and the output terminal OUT. The flying capacitor connected in parallel to the output capacitor Co is not limited to the flying capacitor C3. A series circuit in which flying capacitors including the flying capacitor C3 are connected in series to one another may be connected in parallel to the output capacitor Co.

Figure 3A:
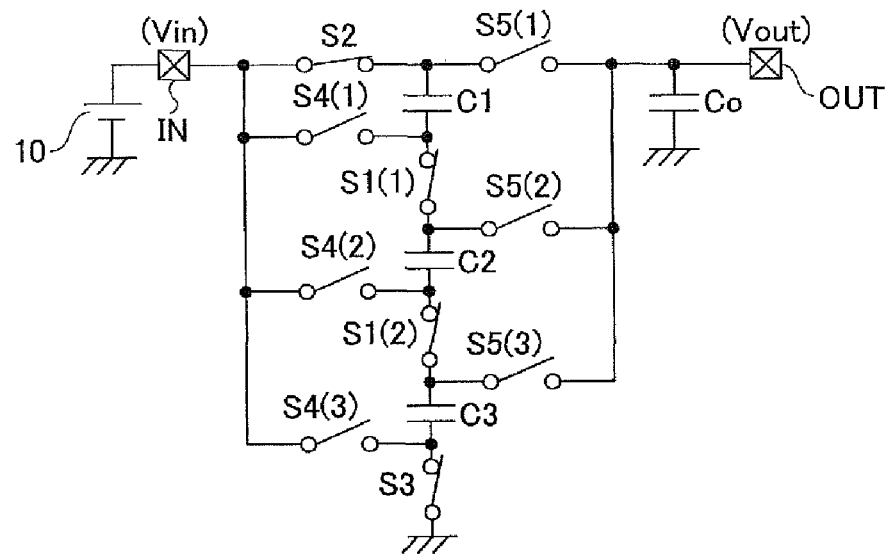
FIGS. 3A through 3C show an example of switching operations of switching elements to output a voltage having a magnitude equal to $(1+\frac{1}{3})$ times the input voltage $V_{in}$ as the output voltage $V_{out}$.
Figure 3B:
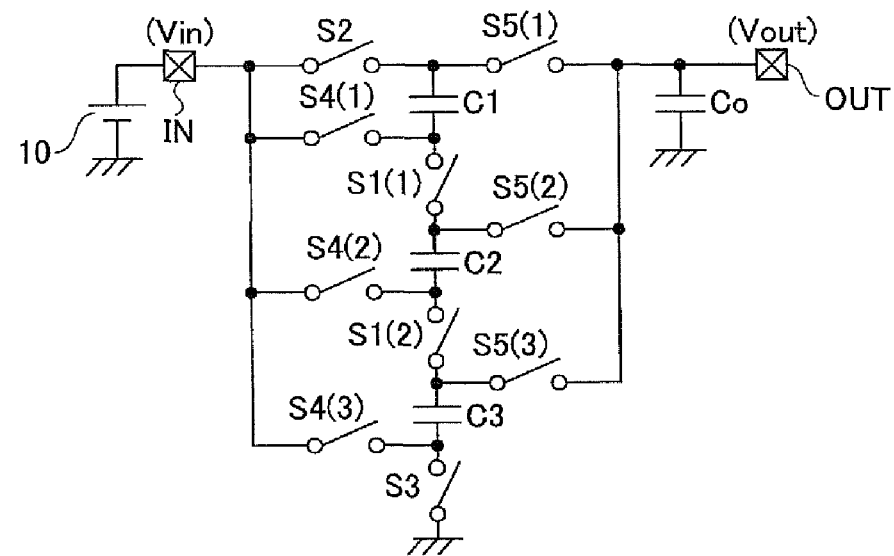
Figure 3C:
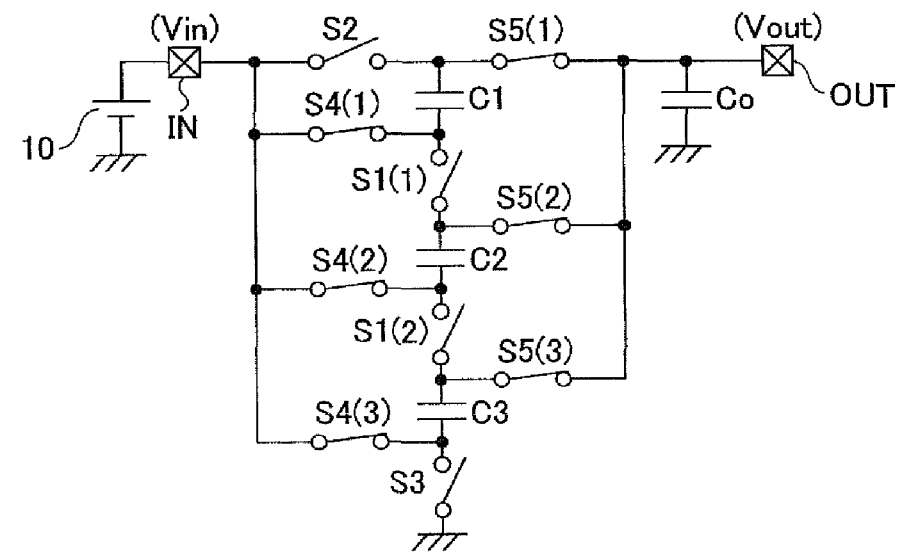

FIGS. 3A through 3C show an example of switching operations of switching elements to output a voltage having a magnitude equal to (1+⅓) times the input voltage $V_{in}$ as the output voltage $V_{out}$.

FIG. 3A shows an ON/OFF mode of each switching element to charge the flying capacitors C1-C3 with the input voltage $V_{in}$. FIG. 3C shows an ON/OFF mode of each switching element to discharge electric charges of the flying capacitors C1-C3, after being charged with the input voltage Vin, to the output terminal OUT and the output capacitor Co. FIG. 3B shows an ON/OFF mode of each switching element to shift from the charging status to the discharging status, and from the discharging status to the charging status. The charge pump circuit 1 repeats the operational sequence of FIGS. 3A→3B→3C→3B→3A.

First, the charging status of FIG. 3A is described.

As shown in FIG. 3A, since both the first switching elements S1 (1 and 2) are turned on and therefore conducting, all the flying capacitors C1-C3 are connected in series to one another. In addition, since the second switching element S2 and the third switching element S3 are turned on and therefore conducting, the input voltage $V_{in}$ is applied to the series circuit of the flying capacitors C1-C3. As a result, each of the flying capacitors C1-C3 is charged with a voltage equal to one-third of the input voltage $V_{in}$.

Then, the charge pump circuit 1 shifts to the status illustrated in FIG. 3B. In FIG. 3B, the second switching element S2 and the third switching element S3 are turned off and therefore blocked and both the first switching elements S1 (1 and 2) are also turned off and therefore blocked. Herewith, the charging of the flying capacitors C1-C3 stops. Next, the charge pump circuit 1 shifts to the status illustrated in FIG. 3C. In FIG. 3C, all the fourth switching elements S4 (1 through 3) and all the fifth switching elements S5 (1 through 3) are turned on and therefore conducting. That is, all the flying capacitors C1-C3 are connected in parallel to one another, and the lower voltage terminals of the flying capacitors C1-C3 are respectively connected to the input terminal IN while their higher voltage terminals are respectively connected to the output terminal OUT. Accordingly, the charges accumulated in the flying capacitors C1-C3 are discharged to a load (not shown) connected to the output terminal OUT via the output capacitor Co.

Next, the charge pump circuit 1 shifts again to the status of FIG. 3B. In FIG. 3B, since all the fourth switching elements S4 (1 through 3) and all the fifth switching elements S5 (1 through 3) are turned off and therefore blocked, the discharging from the flying capacitors C1-C3 to the load through the output capacitor Co stops. Then, when the charge pump circuit 1 shifts to the status of FIG. 3A, the flying capacitors C1-C3 are charged again, as described above. In the operational sequence, when the charge pump circuit 1 shifts to the status of FIG. 3C, the voltage of the higher voltage terminal of each flying capacitor C1-C3 has a magnitude equal to the sum of the input voltage $V_{in}$ and the charging voltage of the flying capacitor C1-C3, ($V_{in}/3$). Thus, by repeating the above operational sequence, the output voltage $V_{out}$ of the charge pump circuit 1 has a magnitude raised to (1+⅓) times the input voltage $V_{in}$.

Figure 4A:
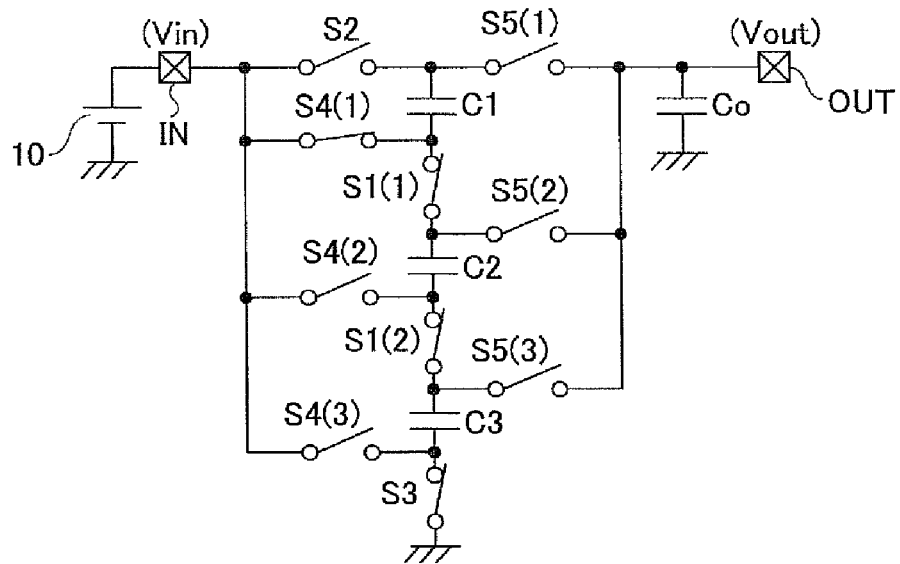
FIGS. 4A through 4C show an example of switching operations of switching elements to output a voltage having a magnitude equal to $(1+\frac{1}{2})$ times the input voltage $V_{in}$ as the output voltage $V_{out}$.
Figure 4B:
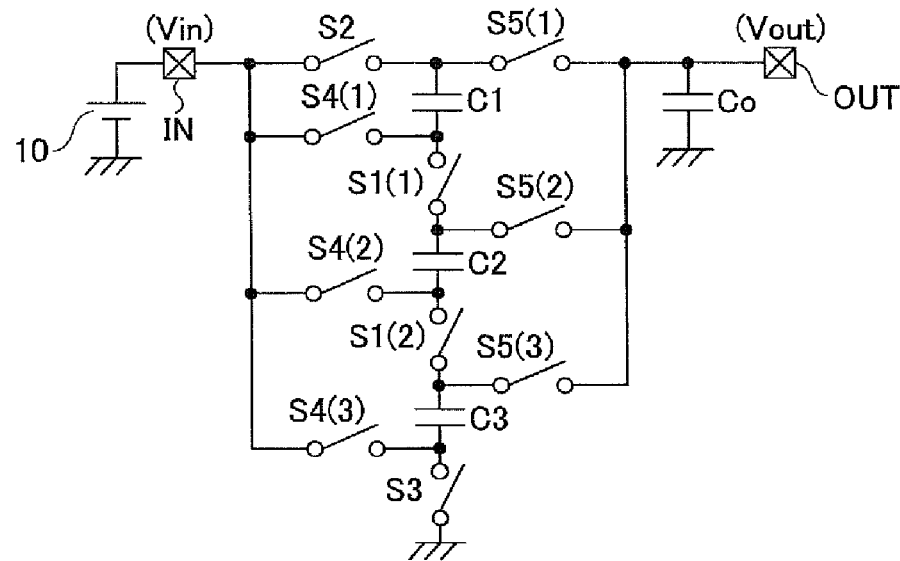
Figure 4C:
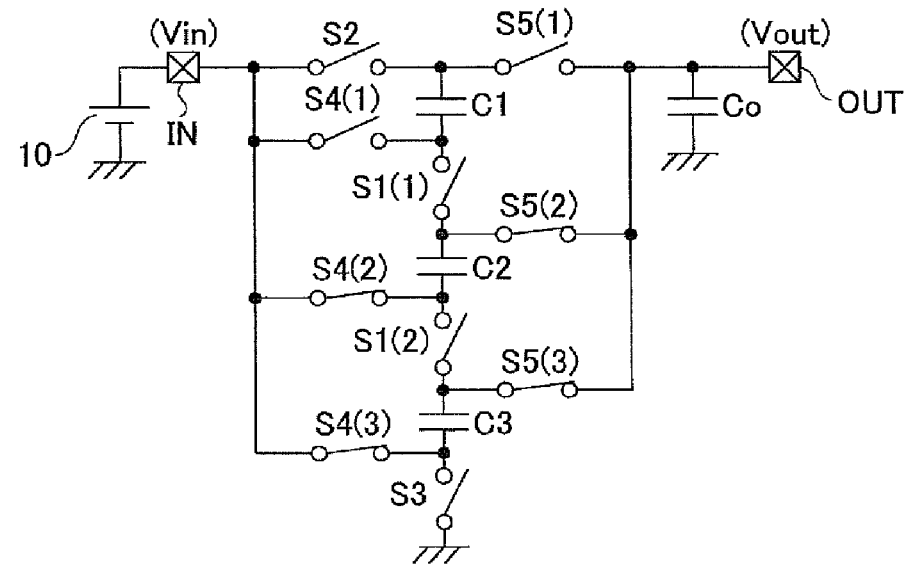

FIGS. 4A through 4C show an example of switching operations of switching elements to output voltage having a magnitude equal to (1+½) times the input voltage V, as the output voltage $V_{out}$.

FIG. 4A shows an ON/OFF mode of each switching element to charge the flying capacitors C1-C3 with the input voltage $V_{in}$. FIG. 4C shows an ON/OFF mode of each switching element to discharge electric charges of the flying capacitors C1-C3, after being charged with the input voltage Vin, to the output terminal OUT and the output capacitor Co. FIG. 4B shows an ON/OFF mode of each switching element to shift from the charging status to the discharging status, and from the discharging status to the charging status. The charge pump circuit 1 repeats the operational sequence of FIGS. 4A→4B→4C→4B→4A.

First, the charging status of FIG. 4A is described.

In FIG. 4A, the first switching elements S1 (1 and 2), the third switching element S3 and the fourth switching element S4 (1) are turned on and therefore conducting while the remaining switching elements are turned off and therefore blocked. In this condition, the flying capacitors C2 and C3 are connected in series to one another, and the input voltage $V_{in}$ is applied to this series circuit. As a result, each of the flying capacitors C2 and C3 is charged with a voltage equal to one-half of the input voltage V.

Then, the charge pump circuit 1 shifts to the status illustrated in FIG. 4B. In FIG. 4B, the third switching element S3 and the fourth switching element S4 (1) are turned off and therefore blocked and both the first switching elements S1 (1 and 2) are also turned off and therefore blocked. Herewith, the charging of the flying capacitors C2 and C3 stops.

Next, the charge pump circuit 1 shifts to the status illustrated in FIG. 4C. In FIG. 4C, the fourth switching elements S4 (2 and 3) and the fifth switching elements S5 (2 and 3) are turned on and therefore conducting. That is, the flying capacitors C2 and C3 are connected in parallel to one another, and the lower voltage terminals of the flying capacitors C2 and C3 are respectively connected to the input terminal IN while their higher voltage terminals are respectively connected to the output terminal OUT. Accordingly, the charges accumulated in the flying capacitors C2 and C3 are discharged to the load through the output capacitor Co.

Next, the charge pump circuit 1 shifts again to the status of FIG. 4B. In FIG. 4B, since the fourth switching elements S4 (2 and 3) and the fifth switching elements S5 (2 and 3) are turned off and therefore blocked, the discharging from the flying capacitors C2 and C3 to the load through the output capacitor Co stops. Then, when the charge pump circuit 1 shifts to the status of FIG. 4A, the flying capacitors C2 and C3 are charged again, as described above. Thus, by repeating the above operational sequence, the output voltage $V_{out}$ of the charge pump circuit 1 has a magnitude raised to (1+½) times the input voltage $V_{in}$.

Figure 5A:
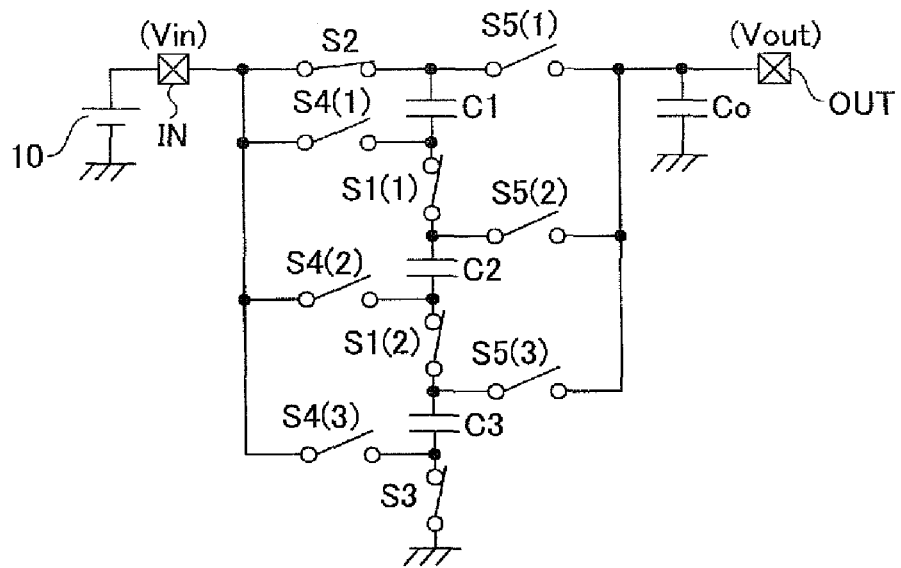
FIGS. 5A through 5C show an example of switching operations of switching elements to output a voltage having a magnitude equal to $(1+\frac{2}{3})$ times the input voltage $V_{in}$ as the output voltage $V_{out}$.
Figure 5B:
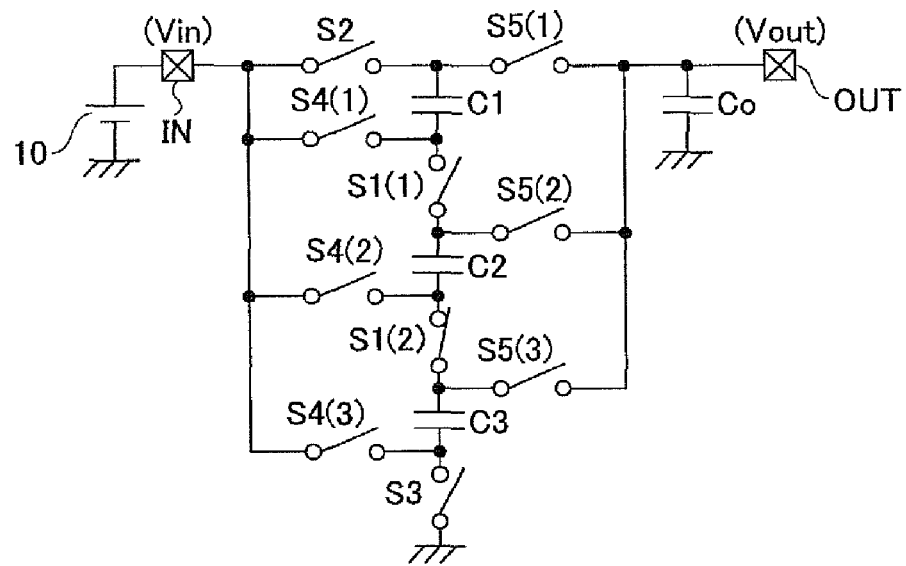
Figure 5C:
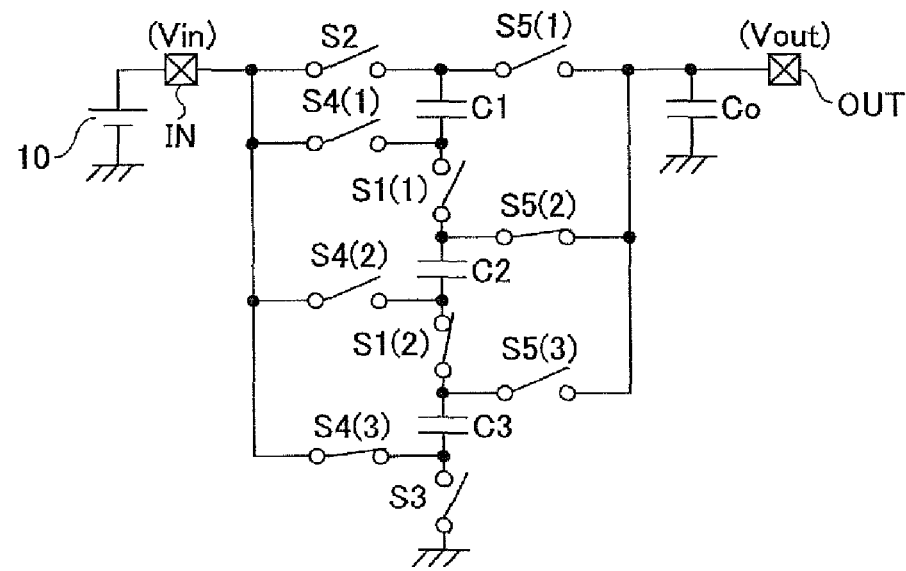

FIGS. 5A through 5C show an example of switching operations of switching elements to output a voltage having a magnitude equal to (1+⅔) times the input voltage $V_{in}$ as the output voltage $V_{out}$.

FIG. 5A shows an ON/OFF mode of each switching element to charge the flying capacitors C1-C3 with the input voltage $V_{in}$. FIG. 5C shows an ON/OFF mode of each switching element to discharge electric charges of the flying capacitors C1-C3, after being charged with the input voltage Vin, to the output terminal OUT and the output capacitor Co. FIG. 5B shows an ON/OFF mode of each switching element to shift from the charging status to the discharging status, and from the discharging status to the charging status. The charge pump circuit 1 repeats the operational sequence of FIGS. 5A→5B→5C→5B→5A.

First, the charging status of FIG. 5A is described.

In FIG. 5A, the first switching elements S1 (1 and 2), the second switching element S2 and the third switching element S3 are turned on and therefore conducting while the remaining switching elements are turned off and therefore blocked. In this condition, the input voltage $V_{in}$ is applied to the series circuit of the flying capacitors C1-C3. As a result, each of the flying capacitors C1-C3 is charged with a voltage equal to one-third of the input voltage $V_{in}$.

Then, the charge pump circuit 1 shifts to the status illustrated in FIG. 5B. In FIG. 5B, the first switching element S1 (1), the second switching element S2 and the third switching element S3 are turned off and therefore blocked. Herewith, the charging of the flying capacitors C1-C3 stops.

Next, the charge pump circuit 1 shifts to the status illustrated in FIG. 5C. In FIG. 5C, the fourth switching element S4 (3) and the fifth switching element S5 (2) are turned on and therefore conducting. In this condition, the lower voltage terminals of the flying capacitors C2 and C3 forming a series circuit are connected to the input terminal IN while their higher voltage terminals are connected to the output terminal OUT. Accordingly, the charges accumulated in the flying capacitors C2 and C3 are discharged to the load through the output capacitor Co.

Next, the charge pump circuit 1 shifts again to the status of FIG. 5B. In FIG. 5B, since the fourth switching element S4 (3) and the fifth switching element S5 (2) are turned off and therefore blocked, the discharging to the load through the output capacitor Co from the flying capacitors C2 and C3 connected in series stops. Then, when the charge pump circuit 1 shifts to the status of FIG. 5A, the flying capacitors C2 and C3 are charged again, as described above. The voltage across the flying capacitors C2 and C3 connected in series has a magnitude equal to two-thirds of the input voltage $V_{in}$. Therefore, by repeating the above operational sequence, the output voltage $V_{out}$ of the charge pump circuit 1 has a magnitude raised to (1+⅔) times the input voltage $V_{in}$.

Figure 6A:
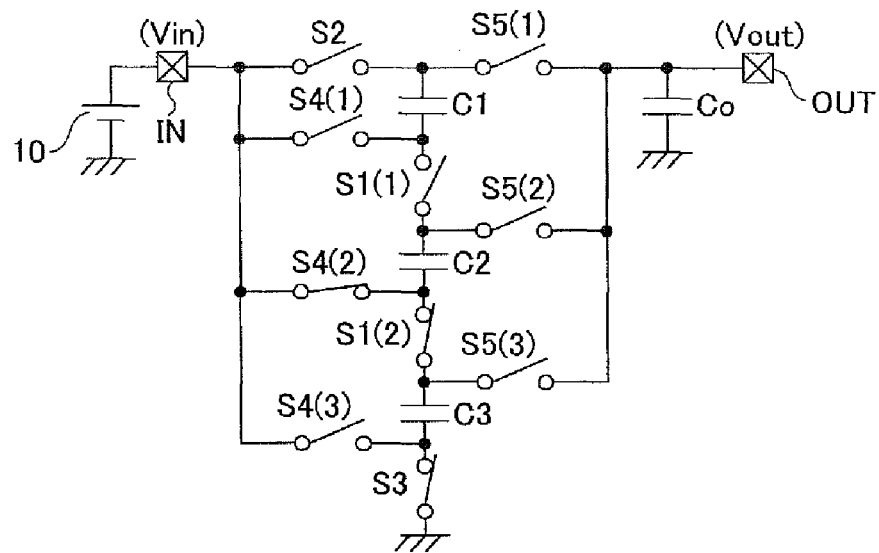
FIGS. 6A through 6C show an example of switching operations of switching elements to output a voltage having a magnitude equal to twice the input voltage $V_{in}$ as the output voltage $V_{out}$.
Figure 6B:
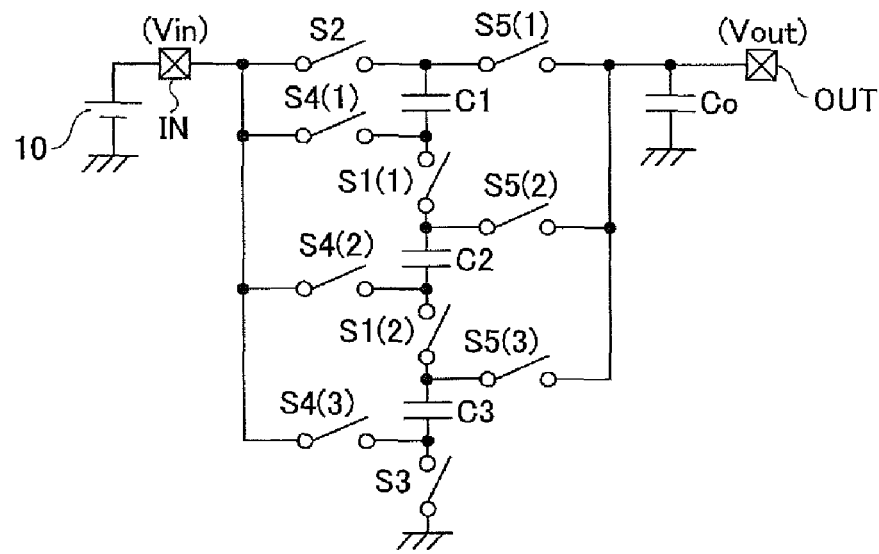
Figure 6C:
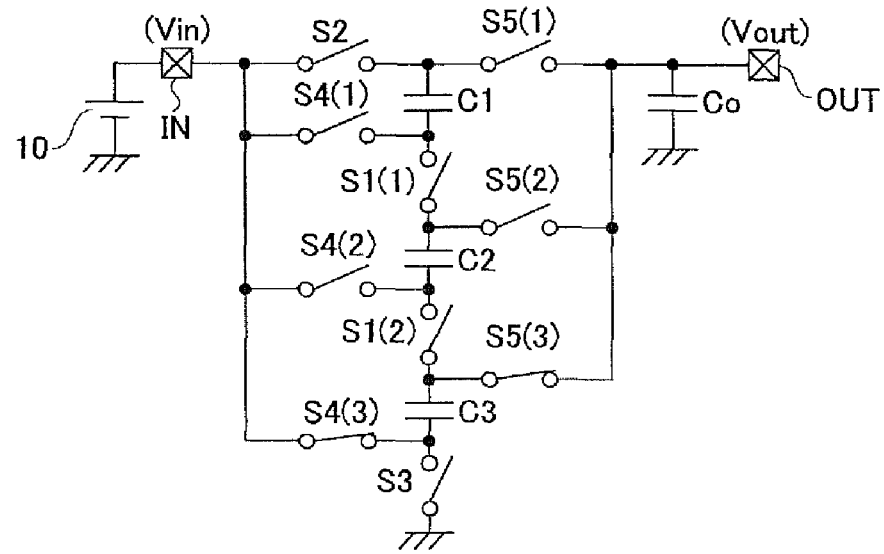

FIGS. 6A through 6C show an example of switching operations of switching elements to output a voltage having a magnitude equal to twice the input voltage $V_{in}$ as the output voltage $V_{out}$.

FIG. 6A shows an ON/OFF mode of each switching element to charge the flying capacitors C1-C3 with the input voltage FIG. 6C shows an ON/OFF mode of each switching element to discharge electric charges of the flying capacitors C1-C3, after being charged with the input voltage Vin, to the output terminal OUT and the output capacitor Co. FIG. 6B shows an ON/OFF mode of each switching element to shift from the charging status to the discharging status, and from the discharging status to the charging status. The charge pump circuit 1 repeats the operational sequence of FIGS. 6A→6B→6C→6B→6A.

In FIG. 6A, the first switching element S1 (2), the third switching element S3 and the fourth switching element S4 (2) are turned on and therefore conducting while the remaining switching elements are turned off and therefore blocked. In this condition, since only the flying capacitor C3 is charged with the input voltage $V_{in}$, the flying capacitor C3 is charged with a voltage equal to the input voltage $V_{in}$.

Then, the charge pump circuit 1 shifts to the status illustrated in FIG. 6O. In FIG. 6B, the first switching element S1 (2), the third switching element S3 and the fourth switching element S4 (2) are turned off and therefore blocked. Herewith, the charging of the flying capacitor C3 stops.

Next, the charge pump circuit 1 shifts to the status illustrated in FIG. 6C. In FIG. 6C, the fourth switching element S4 (3) and the fifth switching element S5 (3) are turned on and therefore conducting. In this condition, the lower voltage terminal of the flying capacitor C3 is connected to the input terminal IN while its higher voltage terminal is connected to the output terminal OUT. Accordingly, the charge accumulated in the flying capacitor C3 is discharged to the load through the output capacitor Co.

Next, the charge pump circuit 1 shifts again to the status of FIG. 6B. In FIG. 6B, since the fourth switching element S4 (3) and the fifth switching element S5 (3) are turned off and therefore blocked, the discharging from the flying capacitor C3 to the load through the output capacitor Co stops.

Then, when the charge pump circuit 1 shifts to the status of FIG. 6A, the flying capacitor C3 is charged again, as described above. The voltage of the flying capacitor C3 has a magnitude equal to the input voltage $V_{in}$. Therefore, by repeating the above operational sequence, the output voltage % $T_{out}$ of the charge pump circuit 1 has a magnitude raised to twice the input voltage $V_{in}$.

Note that in the case where there are multiple possible combinations of ON/OFF modes of the first through fifth switching elements S1-S5 to generate the output voltage $V_{out}$ having the same magnitude value, a combination is usually adopted that allows, during the discharge period, the number of flying capacitors connected in series to be minimized and the number of flying capacitors connected in parallel to be maximized. However, depending on the output condition, a combination may be selected based on a different criterion.

Figure 7A:
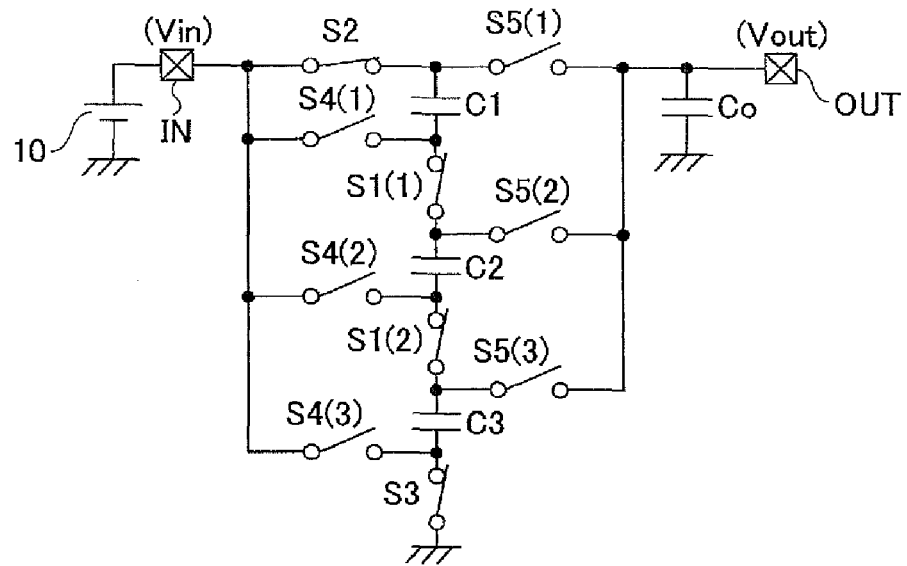
FIGS. 7A through 7C show another example of switching operations of switching elements to output a voltage having a magnitude equal to twice the input voltage $V_{in}$ as the output voltage $V_{out}$.
Figure 7B:
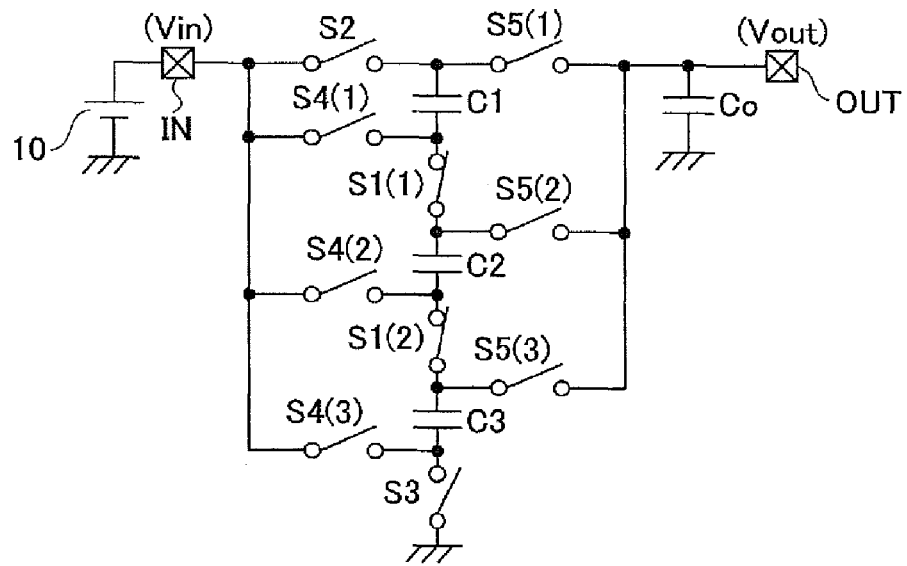
Figure 7C:
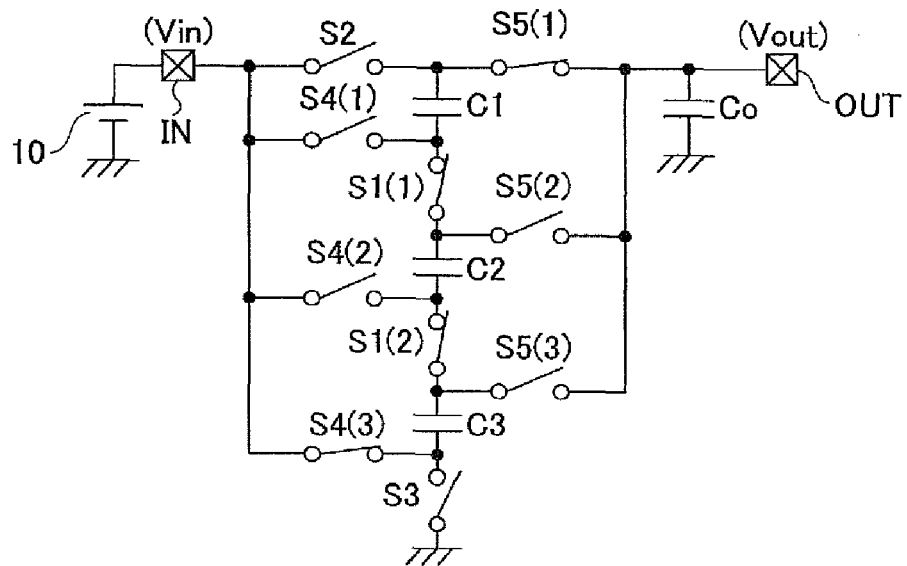

FIGS. 7A through 7C show an example of switching operations of switching elements to output a voltage having a magnitude equal to twice the input voltage $V_{in}$ as the output voltage $V_{out}$.

FIG. 7A shows an ON/OFF mode of each switching element to charge the flying capacitors C1-C3 with the input voltage $V_{in}$. FIG. 7C shows an ON/OFF mode of each switching element to discharge electric charges of the flying capacitors C1-C3, after being charged with the input voltage Vin, to the output terminal OUT and the output capacitor Co. FIG. 7B shows an ON/OFF mode of each switching element to shift from the charging status to the discharging status, and from the discharging status to the charging status. The charge pump circuit 1 repeats the operational sequence of FIGS. 7A→7B→7C→7B→7A.

In FIG. 7A, the first switching elements S1 (1 and 2), the second switching element S2 and the third switching element S3 are turned on and therefore conducting while the remaining switching elements are turned off and therefore blocked. In this condition, the flying capacitors C1-C3 are connected in series to one another, and the input voltage $V_{in}$ is applied to this series circuit. As a result, the flying capacitors C1-C3 connected in series are charged with a voltage equal to the input voltage $V_{in}$.

Then, the charge pump circuit 1 shifts to the status illustrated in FIG. 7B. In FIG. 7B, the second switching element S2 and the third switching element S3 are turned off and therefore blocked, whereby the charging of the flying capacitors C1-C3 connected in series stops.

Next, the charge pump circuit 1 shifts to the status illustrated in FIG. 7C. In FIG. 7C, the fourth switching element S4 (3) and the fifth switching element S5 (1) are turned on and therefore conducting. In this condition, the lower voltage terminals of the flying capacitors C1-C3 are connected to the input terminal IN while their higher voltage terminals are connected to the output terminal OUT. Accordingly, the charges accumulated in the flying capacitors C1-C3 are discharged to the load through the output capacitor Co.

Next, the charge pump circuit 1 shifts again to the status of FIG. 7B. In FIG. 7B, since the fourth switching element S4 (3) and the fifth switching element S5 (1) are turned off and therefore blocked, the discharging to the load through the output capacitor Co from the flying capacitors C1-C3 connected in series stops.

Then, when the charge pump circuit 1 shifts to the status of FIG. 7A, the flying capacitors C1-C3 connected in series are charged again, as described above. The voltage across the flying capacitors C1-C3 has a magnitude equal to the input voltage V. Therefore, by repeating the above operational sequence, the output voltage $V_{out}$ of the charge pump circuit 1 has a magnitude raised to twice the input voltage $V_{in}$.

In the case of FIGS. 7A through 7C, however, three flying capacitors are connected in series to one another, whereby the capacitance of the series circuit is one-third of that of the case of FIGS. 6A through 6C. As a result, the charges discharged to the load through the output capacitor Co in one cycle are smaller compared to the case of FIGS. 6A through 6C. Therefore, unless there is a special output condition required to be fulfilled, the input voltage $V_{in}$ should be boosted in the manner illustrated in FIGS. 6A through 6C.

Although no illustration is provided, the output voltage \T$_{out}$ having a magnitude equal to twice the input voltage $V_{in}$, can also be obtained in the above-described manner by applying the input voltage $V_{in}$ to a series circuit where the flying capacitors C2 and C3 are connected in series to one another. In this case, however, the capacitance of the series circuit is one-half of that of the case of FIGS. 6A through 6C. Therefore, as in the above case, the input voltage Vin should be boosted in the manner illustrated in FIGS. 6A through 6C unless there is a special output condition required to be fulfilled.

Figure 8A:
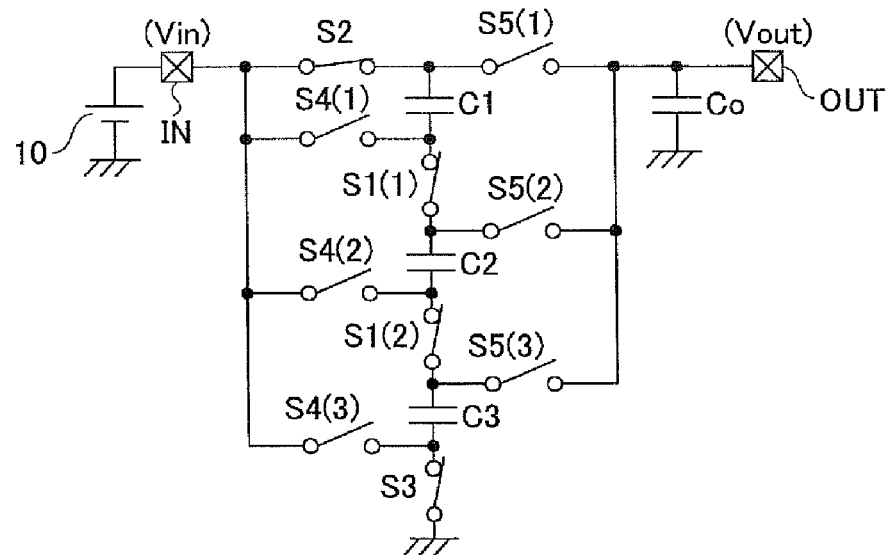
FIGS. 8A through 8C show another example of switching operations of switching elements to output a voltage having a magnitude equal to $(1+\frac{1}{3})$ times the input voltage $V_{in}$ as the output voltage $V_{out}$.
Figure 8B:
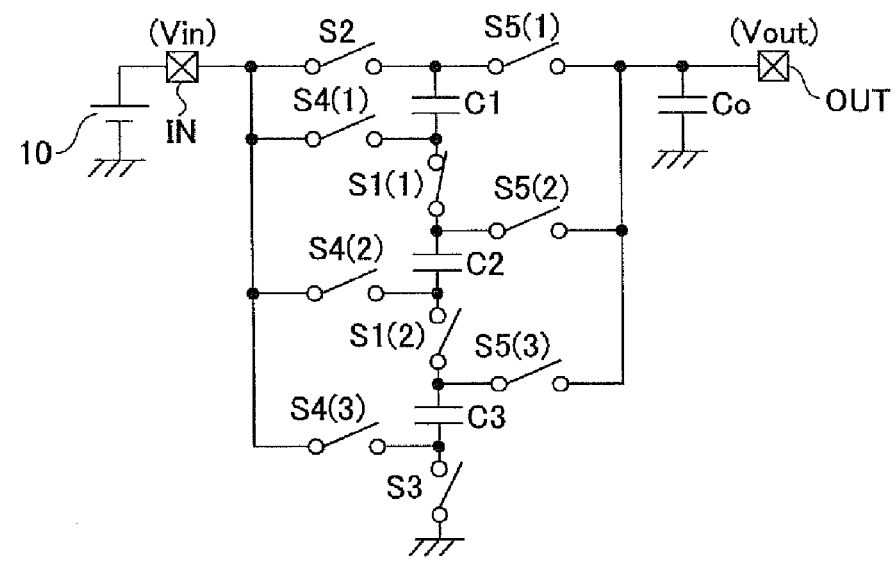
Figure 8C:
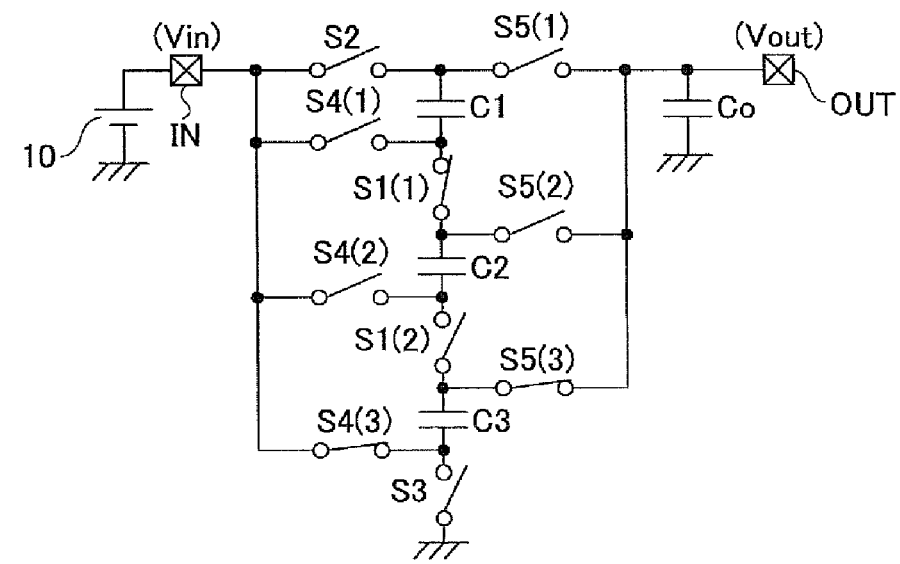

FIGS. 8A through 8C show an example of switching operations of switching elements to output a voltage having a magnitude equal to $(1+\frac{1}{3})$ times the input voltage $V_{in}$, as the output voltage $V_{out}$.

FIG. 8A shows an ON/OFF mode of each switching element to charge the flying capacitors C1-C3 with the input voltage $V_{in}$. FIG. 8C shows an ON/OFF mode of each switching element to discharge electric charges of the flying capacitors C1-C3, after being charged with the input voltage Vin, to the output terminal OUT and the output capacitor Co. FIG. 8B shows an ON/OFF mode of each switching element to shift from the charging status to the discharging status, and from the discharging status to the charging status. The charge pump circuit 1 repeats the operational sequence of FIGS. 8A→8B→8C→8B→8A.

In FIG. 8A, the first switching elements S1 (1 and 2), the second switching element S2 and the third switching element 53 are turned on and therefore conducting while the remaining switching elements are turned off and therefore blocked. In this condition, all the flying capacitors C1-C3 are connected in series to one another, and the input voltage $V_{in}$, is applied to this series circuit. As a result, each of the flying capacitors C1-C3 is charged with a voltage equal to one-third of the input voltage V.

Then, the charge pump circuit 1 shifts to the status illustrated in FIG. 8B. In FIG. 8B, the first switching element S1 (2), the second switching element S2 and the third switching element S3 are turned off and therefore blocked. Herewith, the charging of the flying capacitors C1-C3 connected in series stops.

Next, the charge pump circuit 1 shifts to the status illustrated in FIG. 8C. In FIG. 8C, the fourth switching element S4 (3) and the fifth switching element S5 (3) are turned on and therefore conducting. In this condition, the lower voltage terminal of the flying capacitor C3 is connected to the input terminal IN while its higher voltage terminal is connected to the output terminal OUT. Accordingly, the charge accumulated in the flying capacitor C3 is discharged to the load through the output capacitor Co.

Next, the charge pump circuit 1 shifts again to the status of FIG. 8B. In FIG. 8B, since the fourth switching element S4 (3) and the fifth switching element S5 (3) are turned off and therefore blocked, the discharging from the flying capacitor C3 to the load through the output capacitor Co stops.

Then, when the charge pump circuit 1 shifts to the status of FIG. 8A, the flying capacitors C1-C3 are charged again, as described above. The voltage of the flying capacitor C3 has a magnitude equal to one-third of the input voltage $V_{in}$. Therefore, by repeating the above operational sequence, the output voltage $V_{out}$ of the charge pump circuit 1 has a magnitude raised to $(1+\frac{1}{3})$ times the input voltage $V_{in}$.

Only one flying capacitor is used for discharging in the case of FIGS. 8A through 8C, as compared to the case of FIGS. 3A through 3C in which three flying capacitors are connected in parallel to one another. As a result, the capacitance of the flying capacitor is one-third of that of the case of FIGS. 3A through 3C. As a result, the charge discharged to the load through the output capacitor Co in one cycle is smaller compared to the case of FIGS. 3A through 3C. Therefore, unless there is a special output condition required to be fulfilled, the input voltage $V_{in}$ should be boosted in the manner illustrated in FIGS. 3A through 3C.

Although no illustration is provided, the output voltage $V_{out}$ having a magnitude equal to $(1+\frac{1}{3})$ times the input voltage $V_{in}$ can also be obtained by connecting the flying capacitors C2 and C3 of FIG. 8 in parallel to one another. However, in this case also, the capacitance of the flying capacitances C2 and C3 is smaller compared to the case of FIGS. 3A through 3C. Therefore, the input voltage $V_{in}$ should be boosted in the manner illustrated in FIGS. 3A through 3C unless there is a special output condition required to be fulfilled.

Figure 9A:
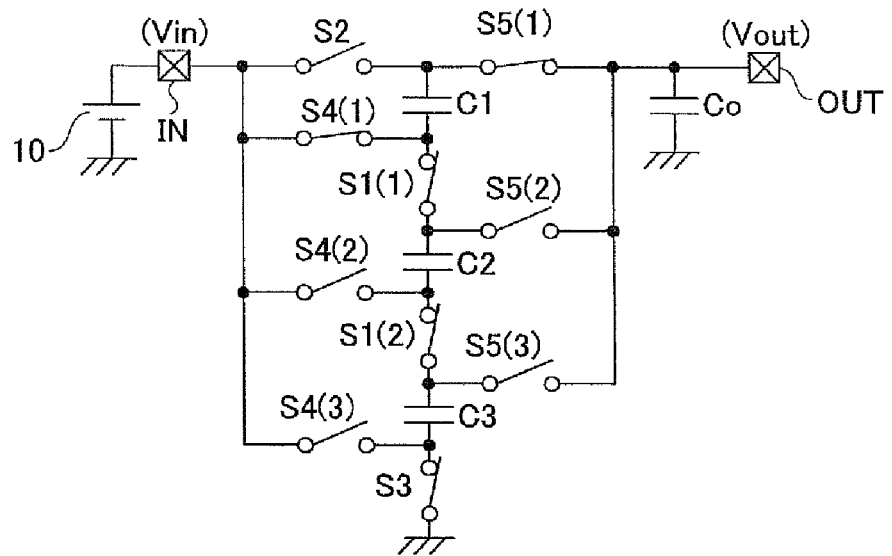
FIGS. 9A through 9C show another example of switching operations of switching elements to output a voltage having a magnitude equal to $(1+\frac{1}{2})$ times the input voltage $V_{in}$ as the output voltage $V_{out}$.
Figure 9B:
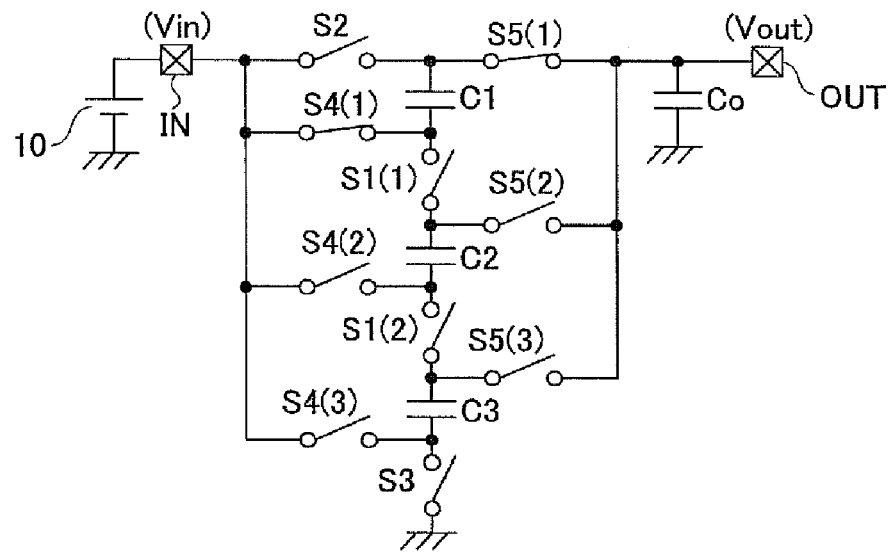
Figure 9C:
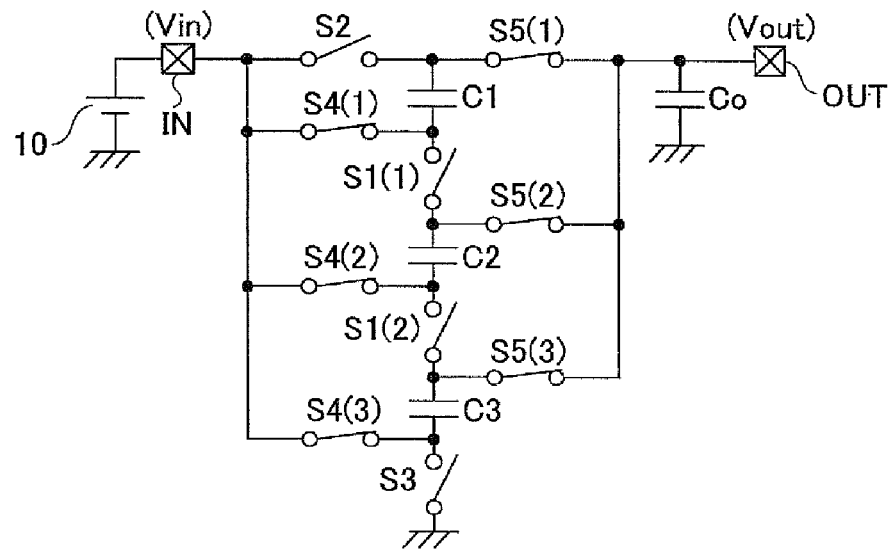
Figure 10A:
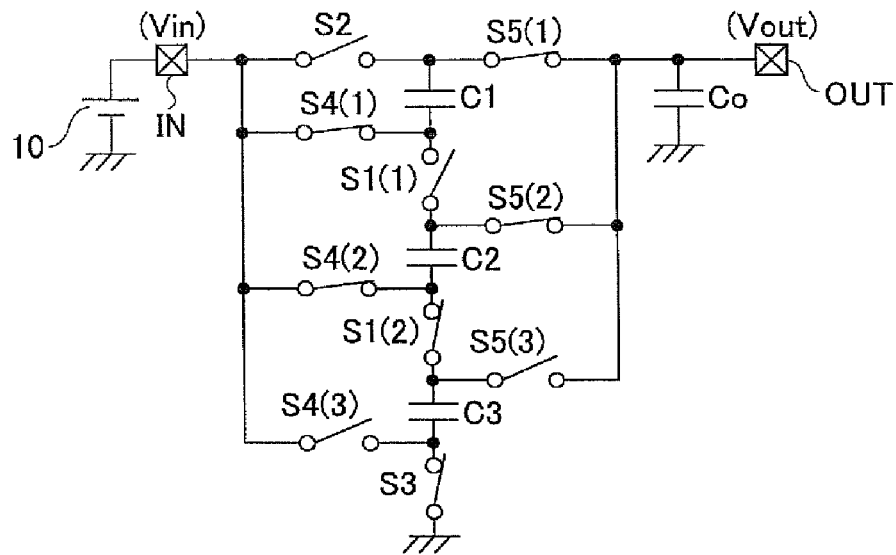
FIGS. 10A through 10C show another example of switching operations of switching elements to output a voltage having a magnitude equal to twice the input voltage $V_{in}$ as the output voltage $V_{out}$.
Figure 10B:
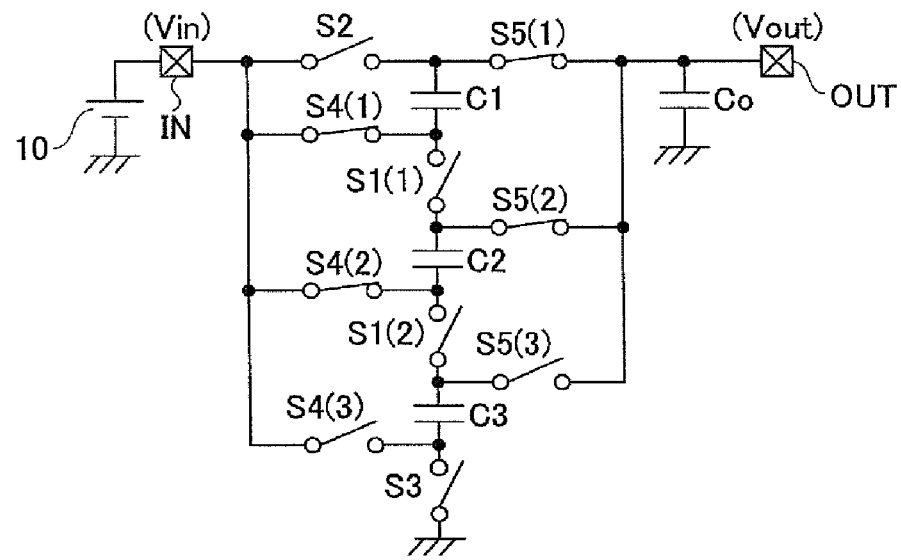
Figure 10C:
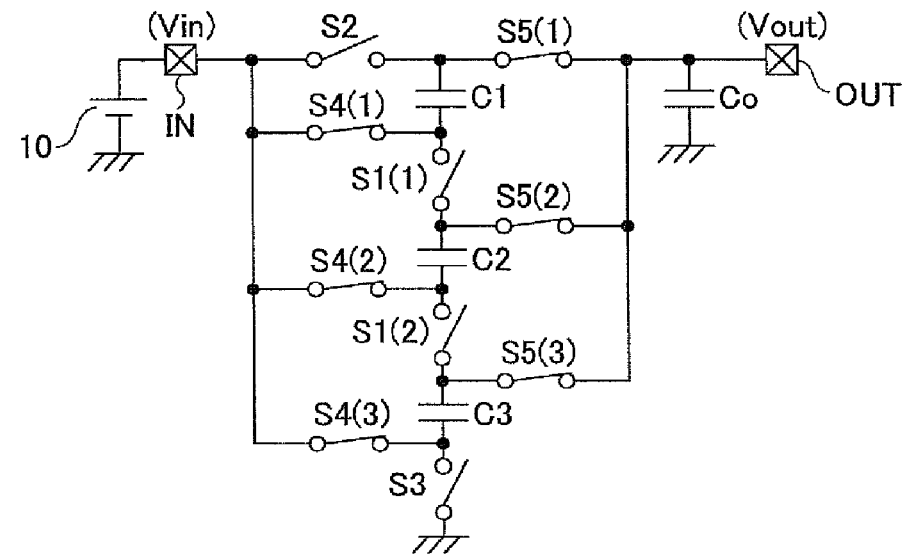
Figure 11:
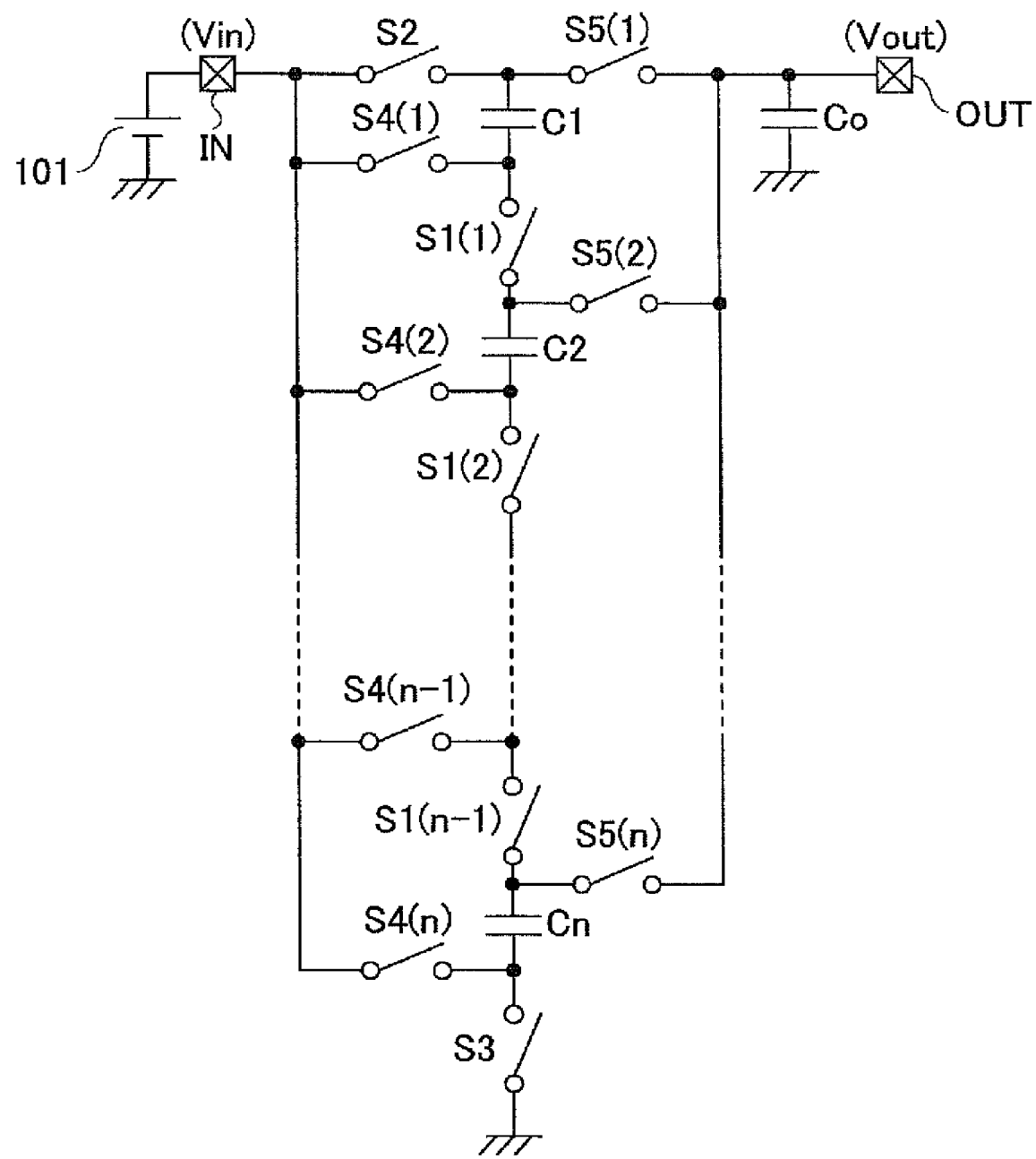
FIG. 11 is a circuit diagram showing an example of a conventional charge pump circuit.

Note that in the case where there are multiple possible combinations of ON/OFF modes of the first through fifth switching elements S1-S5 to generate the output voltage $V_{out}$ having the same magnitude value, a combination is adopted that allows, during the discharge period, the number of flying capacitors connected in series to be minimized and the number of flying capacitors connected in parallel to be maximized unless there is a special output condition required to be fulfilled. FIGS. 9A through 9C and FIGS. 10A through 10C show other examples of switching operations of switching elements when such combinations are adopted. FIGS. 9A through 9C illustrate the case of outputting, as the output voltage $V_{out}$, a voltage having a magnitude equal to $(1+\frac{1}{2})$ times the input voltage $V_{in}$, and FIGS. 10A through 10C illustrate the case of outputting a voltage having a magnitude equal to twice the input voltage V.

FIG. 9A shows an ON/OFF mode of each switching element to charge the flying capacitors C1-C3 with the input voltage $V_{in}$. FIG. 9C shows an ON/OFF mode of each switching element to discharge electric charges of the flying capacitors C1-C3, after being charged with the input voltage Vin, to the output terminal OUT and the output capacitor Co. FIG. 9B shows an ON/OFF mode of each switching element to shift from the charging status to the discharging status, and from the discharging status to the charging status. The charge pump circuit 1 repeats the operational sequence of FIGS. 9A→9B→9C→9B→9A.

In FIG. 9A, the first switching elements S1 (1 and 2), the third switching element S3, the fourth switching element S4 (1) and the fifth switching element S5 (1) are turned on and therefore conducting while the remaining switching elements are turned off and therefore blocked. In this condition, the flying capacitors C2 and C3 connected in series to one another are charged with the input voltage $V_{in}$, thereby each being charged with a voltage equal to one-half of the input voltage $V_{in}$. Furthermore, the flying capacitor C1 is connected in series to the input voltage, and this series circuit is connected in parallel to the output capacitor Co.

Then, the charge pump circuit 1 shifts to the status illustrated in FIG. 9B. In FIG. 9B, the first switching elements S1 (1 and 2) and the third switching element S3 are turned off and therefore blocked. Herewith, the charging of the flying capacitors C2 and C3 stops. However, since the fourth switching element S4 (1) and the fifth switching element S5 (1) remain turned on, the series circuit formed by the flying capacitor C1 and the input voltage $V_{in}$ remains connected in parallel to the output capacitor Co.

Next, the charge pump circuit 1 shifts to the status illustrated in FIG. 9C. In FIG. 9C, all the fourth switching elements S4 (1 through 3) and all the fifth switching elements S5 (1 through 3) are turned on and therefore conducting. The flying capacitors C2 and C3 are connected in parallel to one another, and the lower voltage terminals of the flying capacitors C2 and C3 are respectively connected to the input terminal IN while their higher voltage terminals are respectively connected to the output terminal OUT. Accordingly, the charges accumulated in the flying capacitors C2 and C3 are discharged to the load through the series circuit formed by the output capacitor Co, the flying capacitor C1 and the input voltage $V_{in}$.

Next, the charge pump circuit 1 shifts again to the status of FIG. 9B. In FIG. 9B, since the fourth switching elements S4 (2 and 3) and the fifth switching elements S5 (2 and 3) are turned off and therefore blocked, the discharging from the flying capacitors C2 and C3 to the load through the series circuit stops.

Then, when the charge pump circuit 1 shifts to the status of FIG. 9A, the flying capacitors C2 and C3 are charged again, as described above. By repeating the above operational sequence, the output voltage $V_{out}$ of the charge pump circuit 1 has a magnitude raised to (1+½) times the input voltage $V_{in}$.

The case of FIGS. 9A through 9C differs from the case of FIGS. 4A through 4C in that the flying capacitor C1 which is not used to generate the output voltage $V_{out}$ in the case of FIGS. 4A through 4C is connected in parallel to the output capacitor Co. According to the configuration of FIGS. 9A through 9C, the output capacitance increases, whereby it is possible to improve the stability of the output voltage $V_{out}$.

FIG. 10A shows an ON/OFF mode of each switching element to charge the flying capacitors C1-C3 with the input voltage $V_{in}$. FIG. 10C shows an ON/OFF mode of each switching element to discharge electric charges of the flying capacitors C1-C3, after being charged with the input voltage Vin, to the output terminal OUT and the output capacitor Co. FIG. 10B shows an ON/OFF mode of each switching element to shift from the charging status to the discharging status, and from the discharging status to the charging status. The charge pump circuit 1 repeats the operational sequence of FIGS. 10A→10B→10C→10B→10A.

In FIG. 10A, the first switching element S1 (2), the third switching element S3, the fourth switching elements S4 (1 and 2) and the fifth switching elements S5 (1 and 2) are turned on and therefore conducting while the remaining switching elements are turned off and therefore blocked. In this condition, since the input voltage V, is applied only to the flying capacitor C3, the flying capacitor C3 is charged with a voltage equal to the input voltage V. Furthermore, the flying capacitors C1 and C2 connected in parallel to one another are connected in series to the input voltage $V_{in}$, and this series circuit is connected in parallel to the output capacitor Co.

Then, the charge pump circuit 1 shifts to the status illustrated in FIG. 10B. In FIG. 10B, the first switching element S1 (2) and the third switching element S3 are turned off and therefore blocked. Herewith, the charging of the flying capacitor C3 stops. However, since the fourth switching elements S4 (1 and 2) and the fifth switching elements S5 (1 and 2) remain turned on, and the series circuit formed by the flying capacitors C1 and C2 connected in parallel and the input voltage $V_{in}$ remains connected in parallel to the output capacitor Co.

Next, the charge pump circuit 1 shifts to the status illustrated in FIG. 10C. In FIG. 10C, all the fourth switching elements S4 (1 through 3) and all the fifth switching elements S5 (1 through 3) are turned on and therefore conducting. In this condition, the lower voltage terminal of the flying capacitor C3 is connected to the input terminal IN while its higher voltage terminal is connected to the output terminal OUT. Accordingly, the charge accumulated in the flying capacitor C3 is discharged to the load through the series circuit connected to the output capacitor Co.

Next, the charge pump circuit 1 shifts again to the status of FIG. 10B. In FIG. 10B, since the fourth switching element S4 (3) and the fifth switching element S5 (3) are turned off and therefore blocked, the discharging from the flying capacitor C3 to the load through the series circuit connected to the output capacitor Co stops.

Then, when the charge pump circuit 1 shifts to the status of FIG. 10A, the flying capacitor C3 is charged again, as described above. By repeating the above operational sequence, the output voltage $V_{out}$ of the charge pump circuit 1 has a magnitude raised to twice the input voltage $V_{in}$.

The case of FIGS. 10A through 10C differs from the case of FIGS. 6A through 6C in that the flying capacitors C1 and C2 which are not used to generate the output voltage $V_{out}$ in FIGS. 6A through 6C are connected in parallel to the output capacitor Co. According to the configuration of FIGS. 10A through 10C, the output capacitance increases, whereby it is possible to improve the stability of the output voltage $V_{out}$.

In the cases of FIGS. 9A through 9C and FIGS. 10A through 10C, the output capacitance is increased in the following manner. Regarding a flying capacitor(s) which is not charged with the input voltage $V_{in}$ during the charging period, a fourth switching element(s) connected between the input terminal IN and the lower voltage terminal(s) of the flying capacitor(s) and a fifth switching element(s) connected between the higher voltage terminal(s) of the flying capacitor(s) and the output terminal OUT are constantly kept on. The corresponding fourth and fifth switching elements in this condition are connected in series to the input voltage $V_{in}$, and this series circuit is connected in parallel to the output capacitor Co. Herewith, it is possible to further improve the stability of the output voltage $V_{out}$.

Thus, using the same circuit as the conventional circuit, the charge pump circuit of the first embodiment controls on and off of the first through fifth switching elements selected in accordance with a magnitude of the output voltage $V_{out}$ to be output, thereby being capable of changing the magnitude of the output voltage $V_{out}$ variously within the range between the input voltage $V_{in}$ and twice the input voltage $V_{in}$.

Note that the above description is given of the case where three flying capacitors are provided; however, many more different magnitudes of the output voltage $V_{out}$ can be obtained by increasing the number of flying capacitors. In the case where the number of flying capacitors is n, the magnitudes of the output voltage $V_{out}$ to be obtained are multiplications of the input voltage $V_{in}$ by the following multiplying factors: (1+1/n), (1+2/n), (1+3/n), ..., {1+(n−1)/n}, (1+n/n), $\{1+1/(n-1)\}, \{1+2/(n-1)\}, \{1+3/(n-1)\}, \ldots, \{1+(n-1)/(n-1)\}, \ldots, (1+\frac{1}{3}), (1+\frac{2}{3}), (1+3/3), (1+\frac{1}{2}), (1+2/2), (1+1/1)$ and 1.

In addition, the above description is given of the case where a positive voltage is input to the input terminal IN; however, a negative voltage may be input to the input terminal IN. In this case, the switching operations of the switching elements are the same as described above, and their explanations are therefore omitted.

This application is based on Japanese Patent Application No. 2007-287039 filed in the Japan Patent Office on Nov. 5, 2007, the contents of which are hereby incorporated herein by reference.

The invention claimed is:

1. An operation control method of an output-voltage-variable charge pump circuit for boosting an input voltage input to an input terminal thereof to a desired voltage magnitude in a range between the input voltage and twice the input voltage and outputting the boosted voltage from an output terminal thereof as an output voltage, the charge pump circuit including a plurality of flying capacitors;
one or more first switching elements, each of which is configured to connect two of the flying capacitors in series to form a series circuit including the flying capacitors and the one or more first switching elements;
a second switching element configured to connect one end of the series circuit to the input terminal;
a third switching element configured to connect another end of the series circuit to ground;
a plurality of fourth switching elements, each of which corresponds to a different one of the flying capacitors and is configured to connect a lower voltage terminal of the corresponding flying capacitor to the input terminal; and
a plurality of fifth switching elements, each of which corresponds to a different one of the flying capacitors and is configured to connect a higher voltage terminal of the corresponding flying capacitor to the output terminal, the operation control method comprising the steps of:
(a) during a charging period for charging one or more of the flying capacitors, charging, with the input voltage, one or more of the flying capacitors connected in series by selectively turning on one or more of the first switching elements in accordance with the desired voltage magnitude, turning on the third switching element, and selectively turning on the second switching element or one of the fourth switching elements; and
(b) during a discharging period for discharging charges accumulated in the one or more of the flying capacitors, outputting the output voltage having the desired voltage magnitude from the output terminal by connecting selected one or more of the lower voltage terminals of the one or more charged flying capacitors to the input terminal and connecting selected one or more of the higher voltage terminals of the one or more charged flying capacitors to the output terminal by means of:
turning off the third switching element and the second switching element or the one of the fourth switching elements which has been turned on during the charging period;
controlling an on/off state of one or more of the first switching elements; and
turning on one or more of the fourth switching elements and one or more of the fifth switching elements,
wherein as for one or more flying capacitors that are not charged with the input voltage during the charging period, one or more fourth switching elements connected between the input terminal and the lower voltage terminals of the one or more non-charged flying capacitors and one or more fifth switching elements connected between the output terminal and the higher voltage terminals of the one or more non-charged flying capacitors are constantly kept on.

2. The operation control method as claimed in claim 1, wherein in a case where there are multiple possible combinations of on/off modes of the first through the fifth switching elements during the charging period and the discharging period to generate the output voltage having a same magnitude, a combination is selected that allows, during the discharge period, a number of the one or more charged flying capacitors to be minimized and a number of the charged flying capacitors connected in parallel to be maximized.

3. The operation control method as claimed in claim 1, wherein a period for stopping the charging is provided when a shift is made from the charging period to the discharging period, and a period for stopping the discharging is provided when a shift is made from the discharging period to the charging period.

4. The operation control method as claimed in claim 1, wherein among combinations of the first, the second, the fourth and the fifth switching elements connected in series between the input terminal and the output terminal, the switching elements of all or part of the combinations are turned on to directly connect between the input terminal and the output terminal.

5. The operation control method as claimed in claim 4, wherein the third switching element is turned on to couple the output terminal to the ground through one or more flying capacitors.

* * * * *